United States Patent
Ding et al.

(10) Patent No.: US 10,365,088 B2
(45) Date of Patent: Jul. 30, 2019

(54) DISTRIBUTED MEASURING DEVICE AND METHOD FOR SIMULTANEOUSLY MEASURING STRAIN AND TEMPERATURE BASED ON OPTICAL FREQUENCY DOMAIN REFLECTION

(71) Applicant: Tianjin University, Tianjin (CN)

(72) Inventors: Zhenyang Ding, Tianjin (CN); Di Yang, Tianjin (CN); Tiegen Liu, Tianjin (CN); Yang Du, Tianjin (CN); Zhexi Xu, Tianjin (CN); Kun Liu, Tianjin (CN); Junfeng Jiang, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 15/567,078

(22) PCT Filed: Oct. 27, 2016

(86) PCT No.: PCT/CN2016/103519
§ 371 (c)(1),
(2) Date: Oct. 17, 2017

(87) PCT Pub. No.: WO2017/166801
PCT Pub. Date: Oct. 5, 2017

(65) Prior Publication Data
US 2019/0011253 A1 Jan. 10, 2019

(30) Foreign Application Priority Data

Mar. 29, 2016 (CN) .......................... 2016 1 0190033

(51) Int. Cl.
*G01B 11/16* (2006.01)
*G01D 5/353* (2006.01)
*G02B 6/293* (2006.01)

(52) U.S. Cl.
CPC ............ *G01B 11/161* (2013.01); *G01B 11/16* (2013.01); *G01B 11/168* (2013.01); *G01D 5/35329* (2013.01); *G02B 6/2935* (2013.01)

(58) Field of Classification Search
CPC ................................................ G01M 11/3172
See application file for complete search history.

(56) References Cited

U.S. PATENT DOCUMENTS

| | | | | |
|---|---|---|---|---|
| 5,412,464 A | * | 5/1995 | Thomas | ............. G01M 11/3172 250/227.21 |
| 2014/0176937 A1 | * | 6/2014 | Liu | .................... G01D 5/35329 356/73.1 |

(Continued)

*Primary Examiner* — Shawn Decenzo
(74) *Attorney, Agent, or Firm* — George G. Wang; Bei & Ocean

(57) ABSTRACT

The present invention discloses a distributed device for simultaneously measuring strain and temperature based on optical frequency domain reflection, comprising a tunable laser, a 1:99 beam splitter, a main interferometer system, a light source phase monitoring system based on an auxiliary interferometer, an acquisition device and a computer processing unit, wherein the main interferometer system comprises two Mach-Zehnder interferometers, and two optical fibers having different cladding diameters are arranged in parallel as sensing fibers. Due to the difference in temperature and strain coefficients of optical fibers of the same diameter, the temperature and strain values during changing the temperature and strain simultaneously can be obtained by matrix operation, thereby achieving an effect of eliminating cross sensitivity of temperature and strain sensing in optical frequency domain reflection.

7 Claims, 1 Drawing Sheet

(56) References Cited

U.S. PATENT DOCUMENTS

| | | | |
|---|---|---|---|
| 2015/0263804 A1* | 9/2015 | Horikx | G01M 11/3172 398/16 |
| 2015/0323405 A1* | 11/2015 | Halmetschlager | G01L 11/025 356/32 |
| 2016/0025523 A1* | 1/2016 | Liu | G01D 5/353 250/227.21 |
| 2017/0276523 A1* | 9/2017 | Lally | G01D 5/35361 |

* cited by examiner

DISTRIBUTED MEASURING DEVICE AND METHOD FOR SIMULTANEOUSLY MEASURING STRAIN AND TEMPERATURE BASED ON OPTICAL FREQUENCY DOMAIN REFLECTION

TECHNICAL FIELD

The present invention relates to the technical field of distributed fiber sensing devices, and in particular to a distributed measuring device and method for simultaneously measuring strain and temperature based on optical frequency domain reflection.

BACKGROUND OF THE PRESENT INVENTION

Distributed strain sensing devices with high precision and high spatial resolution are widely used in the livelihoods and national defense security fields, such as structural health monitoring of aircraft, spacecraft, ships, defense equipments, industrial equipments, bridge culverts and other key parts, and a distributed strain sensing with high precision and high spatial resolution can be achieved by using the Rayleigh scattering spectral shift of a single mode fiber in optical frequency domain reflection. However, in practical applications, the temperature and the strain changing at the same time will cause Rayleigh scattering spectral shift, i.e., a cross sensitivity problem. Therefore, it is required to adopt a new method to overcome the cross sensitivity problem.

SUMMARY OF THE PRESENT INVENTION

Based on the above-mentioned prior art and the existing problems, the present invention provides a system for eliminating cross sensitivity caused by temperature and strain sensing in optical frequency domain reflection, which performs a distributed strain and temperature measurement based on Rayleigh scattering spectral shift of a single mode fiber in optical frequency domain reflection, and adopts two optical fibers having different cladding diameters arranged in parallel as sensing fibers. Due to the optical fibers have different temperature and strain coefficients under same diameter cladding, the changed temperature and strain values during changing the temperature and strain simultaneously can be obtained by matrix operation, thereby achieving an effect of eliminating cross sensitivity of temperature and strain sensing in optical frequency domain reflection.

The present invention provides a distributed device for simultaneously measuring strain and temperature based on optical frequency domain reflection, including a tunable laser; a 1:99 beam splitter, a main interferometer system, a light source phase monitoring system based on an auxiliary interferometer, an acquisition device and a computer processing unit, wherein:

The tunable laser: providing a light source for the device so as to achieve linear scanning;

The 1:99 beam splitter: the emergent light of the tunable laser enters into one port of the 1:99 beam splitter and emits from other two ports of the 1:99 beam splitter under a ratio of 1:99 to the light source phase monitoring system based on auxiliary interferometer and the main interferometer system;

The light source phase monitoring system based on auxiliary interferometer: collecting phase information of the emergent light in real time, and a structure thereof includes an isolator, a 50:50 coupler, a first Faraday mirror and a second Faraday mirror, a delay fiber and a detector; wherein the isolator prevents the reflected light emitted from the 50:50 coupler from entering into the tunable laser; the 50:50 coupler is used for optical interference; the light passes through the isolator and then enters into a second port of the 50:50 coupler, and then emits from a third port and a fourth port of the 50:50 coupler, and the two emitted light beams are reflected by the first Faraday mirror and the second Faraday mirror which are arranged at the arms of the light source phase monitoring system based on auxiliary interferometer respectively, and then the light beams return back to the third port and fourth port of the 50:50 coupler for interference in the 50:50 coupler and the interference light emits from the second port of the 50:50 coupler, and the emergent light is collected by a detector;

The main interferometer system: measuring the Rayleigh backscattering in the two sensing fibers according to the interference principle, and a structure thereof includes two Mach-Zehnder interferometers which are respectively used for measuring the Rayleigh backscattering in a sensing fiber and separated by the beam splitter, wherein: each Mach-Zehnder interferometer includes a circulator, a 50:50 beam splitter, a 50:50 coupler, a polarization controller, a sensing fiber, a first polarization beam splitter, a second polarization beam splitter, a first balanced detector and a second balanced detector; the acquisition device converts analog signals output by the first and second balanced detectors and the first and second polarization beam splitters into digital signals and then transmits the digital signals to the computer processing unit; the computer processing unit performs data processing on the collected interference signal to obtain strain measurement results; wherein, the working process of each Mach-Zehnder interferometer includes: the light enters into a first port of the 50:50 beam splitter, passes through the second port thereof and enters into the polarization controller on the reference arm, the light emits from the third port of the 50:50 beam splitter and enters into a first port of the circulator on the test arm, and the light emits from a third port of the circulator and then enters into the sensing fiber to be measured, while the Rayleigh backscattering light of the sensing fiber enters into the third port of the circulator and emits from the second port of the circulator; the reference light on the reference arm and the Rayleigh backscattering light of the sensing fiber on the test arm emit from the first and second ports of the 50:50 coupler and enter into the coupler for beam combination and form a beat frequency interference signal, and then the signals emit from the third and fourth ports of the 50:50 coupler; the emergent light signals are connected to ends c of the first and second polarization beam splitters, respectively, ends s of the first and second polarization beam splitters are connected to the first balanced detector and ends p thereof are connected to the second balanced detector;

The sensing fiber consists of two kinds of fibers having two different cladding diameters, and generates Rayleigh scattering spectral frequency shift; when the temperature and the strain change simultaneously in the actual measurement, the temperature variation change value $\Delta T$ and the strain variation $\Delta\varepsilon$ are obtained according to the following relationship:

$$\begin{bmatrix}\Delta T \\ \Delta\varepsilon\end{bmatrix} = \frac{1}{K_{S1}K_{T2} - K_{T1}K_{S2}}\begin{bmatrix}K_{T2} & -K_{T1} \\ -K_{S2} & K_{S1}\end{bmatrix}\begin{bmatrix}\Delta f_1 \\ \Delta f_2\end{bmatrix}$$

Wherein, the temperature sensing coefficients of the sensing fiber are $K_{T1}$ and $K_{T2}$, the strain sensing coefficients are $K_{S1}$ and $K_{S2}$ and the Rayleigh scattering spectral frequency shift of the first and second sensing fibers are $\Delta f_1$ and $\Delta f_2$, respectively.

The present invention further provides a distributed method for simultaneously measuring strain and temperature based on optical frequency domain reflection, including the following steps:

Step 1: sending the emergent light of the tunable laser to enter into one port of a 1:99 beam splitter and emit from other two ports of the 1:99 beam splitter under a ratio of 1:99 to a light source phase monitoring system based on auxiliary interferometer and a main interferometer system;

Step 2: collecting phase information of the emergent light in real time according to the light source phase monitoring system based on auxiliary interferometer;

Step 3: measuring the Rayleigh backscattering in the two sensing fibers according to the interference principle via the main interferometer system, wherein the sensing fibers to be measured consist of two optical fibers having different cladding diameters, the main interferometer system transmits the measured Rayleigh backscattering signals in the two sensing fibers to a computer, and the computer performs cross-correlation and other data processing on the signals to obtain Rayleigh backscattering spectral frequency shifts;

Calibrating two single mode fibers having different cladding diameters at different temperatures and strains according to Rayleigh scattering spectral frequency shifts of the first and second sensing fibers respectively demodulated by the computer so as to obtain a calibration curve of the Rayleigh scattering spectral frequency shift at different temperatures and a calibration curve of the Rayleigh scattering spectral frequency shift at different strains;

Obtaining the temperature sensing coefficients $K_{T1}$ and $K_{T2}$ of the two optical fibers according to the calibration curve of the Rayleigh scattering spectral frequency shift at different temperatures, and obtaining the strain sensing coefficients $K_{S1}$ and $K_{S2}$ according to the calibration curve of the Rayleigh scattering spectral frequency shift at different strains;

When the temperature and the strain change simultaneously in the actual measurement, the Rayleigh scattering spectral frequency shifts of the sensing fibers demodulated by the distributed device for simultaneously measuring strain and temperature based on optical frequency domain reflection are $\Delta f_1$ and $\Delta f_2$, the corresponding temperature variation is $\Delta T$ and the strain variation is $\Delta\varepsilon$, which are obtained according to the following relationship:

$$\begin{bmatrix} \Delta T \\ \Delta\varepsilon \end{bmatrix} = \frac{1}{K_{S1}K_{T2} - K_{T1}K_{S2}} \begin{bmatrix} K_{T2} & -K_{T1} \\ -K_{S2} & K_{S1} \end{bmatrix} \begin{bmatrix} \Delta f_1 \\ \Delta f_2 \end{bmatrix}$$

Step 4: performing data processing on the collected interference signal to obtain strain measurement results.

Compared with the prior art, the invention has the following advantages:

According to the present invention, the simultaneous strain and temperature measurement is achieved by using fibers having different cladding diameters, i.e., a standard optical fiber and a small-diameter optical fiber, and the two optical fibers that constitute the sensing fiber are not limited to the standard optical fiber and the small-diameter optical fiber, where a relational expression of $K_{S1}K_{T2}-K_{T1}K_{S2}\neq 0$ between the temperature sensing coefficients $K_{T1}$ and $K_{T2}$ and the strain sensing coefficients $K_{S1}$ and $K_{S2}$ of the two optical fibers is met, the temperature and the strain change parameters can be measured simultaneously.

DETAILED DESCRIPTION OF THE PRESENT INVENTION

Figure 1:
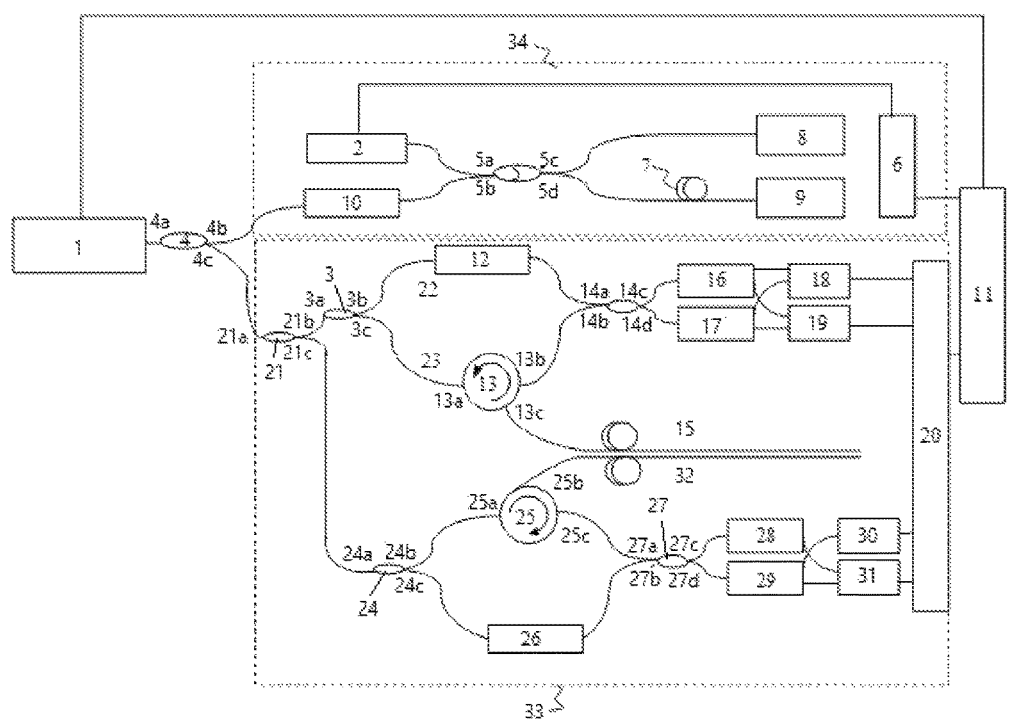
FIG. 1 is a structural diagram of a strain and temperature simultaneous sensing system based on Rayleigh scattering spectral shift in optical frequency domain reflection, In which:
1: tunable laser;
2: detector;
3: first 50:50 beam splitter;
4: 1:99 beam splitter;
5: second 50:50 beam splitter;
6: clock shaping circuit module;
7: delay fiber;
8: first Faraday mirror;
9: second Faraday mirror;
10: isolator;
11: computer;
12: polarization controller;
13: first circulator;
14: third 50:50 coupler;
15: first sensing fiber;
16: first polarization beam splitter;
17: second polarization beam splitter;
18: first balanced detector;
19: second balanced detector;
20: acquisition device;
21: first beam splitter;
221: first reference arm;
231: first test arm;
24: second 50:50 beam splitter;
25: second circulator;
222: second reference arm;
232: second test arm;
26: polarization controller;
27: fourth 50:50 coupler;
28: third polarization beam splitter;
29: fourth polarization beam splitter;
30: third balanced detector;
31: fourth balanced detector;
32: second sensing fiber;
33: main interferometer system;
34: light source phase monitoring system based on auxiliary interferometer.

The technical solutions of the present invention will be further described in detail with reference to the accompanying drawings by embodiments.

As shown in FIG. 1, a system for eliminating cross sensitivity of temperature and strain sensing in optical frequency domain reflection of the present invention includes a tunable laser 1; a 1:99 beam splitter 4, a main interferometer system 33, a light source phase monitoring system 34 based on an auxiliary interferometer, and a computer processing unit 11, wherein:

The tunable laser 1: providing a light source for the system, and the optical frequency thereof may achieve linear scanning;

The 1:99 beam splitter 4: the emergent light of the tunable laser 1 enters into a port 4a of the 1:99 beam splitter 4 and emits from a port 4b and a port 4c of the 1:99 beam splitter 4 under a ratio of 1:99 to the light source phase monitoring system 34 based on auxiliary interferometer and the main interferometer system 33;

The light source phase monitoring system 34 based on auxiliary interferometer: collecting phase information of the emergent light in real time, and a structure thereof includes an isolator 10, a second 50:50 coupler 5, a first Faraday mirror 8 and a second Faraday mirror 9, a delay fiber 7 and a detector 2;

The isolator 10: preventing the reflected light emitted from a port 4b of the second 50:50 coupler 5 from entering into the tunable laser 1;

The second 50:50 coupler 5: providing optical interference; the light enters into a port 5b of the second 50:50 coupler 5 and then emits from a port 5c and a port 5d of the second 50:50 coupler 5, and the two light beams are reflected by the first Faraday mirror 8 and the second Faraday mirror 9 which are arranged at the arms of the light source phase monitoring system 34 based on auxiliary interferometer respectively, and then the light beams return back to the port 5c and the port 5d of the second 50:50 coupler 5, the two light beams are interfered in the 50:50 coupler 5 and the interference light emits from a port 5a of the 50:50 coupler;

The first Faraday mirror 8 and the second Faraday mirror 9: providing reflection for the light source phase monitoring system 34 based on auxiliary interferometer and eliminating polarization-induced fading of the interferometer;

The delay fiber 7: realizing non-equal-arm beat frequency interference;

The detector 2: collecting the emergent light from a port 5a of the second 50:50 coupler 5;

The main interferometer system 33: including two Mach-Zehnder interferometers separated by the first beam splitter 21, one of which, i.e., a first Mach-Zehnder interferometer, includes a first circulator 13, a first 50:50 beam splitter 3, a third 50:50 coupler 14, a polarization controller 12, a first sensing fiber 15, a first polarization beam splitter 16, a second polarization beam splitter 17, a first balanced detector 18 and a second balanced detector 19; the other one of which, i.e., a second Mach-Zehnder interferometer, includes a second circulator 25, a second beam splitter 24, a fourth 50:50 coupler 27, a polarization controller 26, a second sensing fiber 32, a third polarization beam splitter 28, a fourth polarization beam splitter 29, a third balanced detector 30 and a fourth balanced detector 31; the acquisition device 20 converts analog signals output by the first and second balanced detectors 18 and 19 and the first and second polarization beam splitters 28 and 29 into digital signals and then transmits the digital signals to the computer processing unit 11;

The first 50:50 beam splitter 3 in the first Mach-Zehnder interferometer: splitting the light emitted from the interferometer; the light enters into a port 3a of the first 50:50 beam splitter 3, n passes through a port 3b of the first 50:50 beam splitter 3 and enters into the polarization controller 12 on the reference arm 22 of the interferometer, the light passes through a port 3c of the first 50:50 beam splitter 3 and enters into a port 13a of the first circulator 13 on the test arm 23 of the interferometer;

The polarization controller 12 on the reference arm 22 of the Mach-Zehnder interferometer: adjusting polarization of reference light so as to keep light intensity in two orthogonal directions substantially consistent with each other when polarization splitting;

The first circulator 13 on the test arm 23 of the Mach-Zehnder interferometer: the light enters into the port 13a of the first circulator 13, and then passes through a port 13c of the first circulator 13 and enters into the optical fiber 15 to be measured, and the Rayleigh backscattering light of the optical fiber 15 to be measured enters into the port 13c of the first circulator 13, and emits from a port 13b of the first circulator 13;

The third 50:50 beam splitter 14: transmitting the reference light on the reference arm and the Rayleigh backscattering light of the sensing fiber 15 on the test arm into the coupler to perform beam combination and form beat frequency interference signals via a port 14a and a port 14b of the third 50:50 coupler 14, and emitting the light beams from a port 14c and a port 14d of the third 50:50 coupler 14; and then the emergent light signals are connected to ends c of the first and second polarization beam splitters 16 and 17, ends s of the first and second polarization beam splitters 16 and 17 are connected to the first balanced detector 18 and ends p thereof are connected to the second balanced detector 19;

Wherein, the connection mode of the second circulator 25, the second beam splitter 24, the fourth 50:50 coupler 27, the polarization controller 26, the second sensing fiber 32, the third polarization beam splitter 28, the fourth polarization beam splitter 29, the third balanced detector 30 and the fourth balanced detector 31 in the second Mach-Zehnder interferometer is the same as that of the first Mach-Zehnder interferometer;

The polarization light in two polarization orthogonal directions is split by the first, second, third and fourth polarization beam splitters 16, 17, 28 and 29, and the light beams emit from the ends s and the ends p respectively. The first, second, third and fourth balanced detectors 18, 19, 30 and 31 and the detector 2 convert the optical signals into electrical signals;

The acquisition device 20: collecting the analog signals output by the third and fourth balanced detectors 30 and 31 and the detector 2 and then transmitting the signals to the computer processing unit 11; wherein, the computer processing unit 11 performs data processing on the collected interference signals;

The first sensing fiber 15 and the second sensing fiber 32 adopts two single mode fibers having different cladding diameters as optical fibers, e.g., the standard optical fibers and the small-diameter optical fibers; when the first sensing fiber 15 and the second sensing fiber 32 are attached on an object to be measured, the two optical fibers should be ensured to be in close contact.

The present invention also discloses a method for eliminating cross sensitivity of temperature and strain sensing in optical frequency domain reflection, including the following steps:

Step 1: calibrating two single mode fibers having different cladding diameters at different temperatures and strains according to Rayleigh scattering spectral frequency shifts of the first and second sensing fibers 15 and 32 respectively demodulated by an optical frequency domain reflection system so as to obtain a calibration curve of the Rayleigh scattering spectral frequency shift at different temperatures and a calibration curve of the Rayleigh scattering spectral frequency shift at different strains;

Step 2: obtaining the temperature sensing coefficients $K_{T1}$ and $K_{T2}$ of the two optical fibers according to the calibration curve of the Rayleigh scattering spectral frequency shift at different temperatures, and obtaining the strain sensing coefficients $K_{S1}$ and $K_{S2}$ according to the calibration curve of the Rayleigh scattering spectral frequency shift at different strains;

Step 3: when the temperature and the strain change simultaneously in the actual measurement, the Rayleigh scattering spectral frequency shifts of the two optical fibers, i.e., the first sensing fiber 15 and second sensing fiber 32, demodulated by the optical frequency domain reflection system are $\Delta f_1$ and $\Delta f_2$, the corresponding temperature variation is $\Delta T$ and the strain variation is $\Delta \varepsilon$, which are obtained according to the following relationship:

$$\begin{bmatrix} \Delta T \\ \Delta \varepsilon \end{bmatrix} = \frac{1}{K_{S1}K_{T2} - K_{T1}K_{S2}} \begin{bmatrix} K_{T2} & -K_{T1} \\ -K_{S2} & K_{S1} \end{bmatrix} \begin{bmatrix} \Delta f_1 \\ \Delta f_2 \end{bmatrix}$$

It is achieved by adopting fibers having different cladding diameter, i.e., standard optical fibers and small-diameter optical fibers. However, the method is not limited to using the standard optical fibers and the small-diameter optical fibers only, where a relational expression of $K_{S1}K_{T2} - K_{T1}K_{S2} \neq 0$ between the temperature sensing coefficients $K_{T1}$ and $K_{T2}$ and the strain sensing coefficients $K_{S1}$ and $K_{S2}$ of the two optical fibers is met, the temperature and strain parameters can be measured simultaneously. The method adopts a standard communication optical fiber (a cladding diameter of 125 microns and a total diameter of 250 microns with a coating layer) and a small-diameter single mode fiber (a cladding diameter of 80 microns and a total diameter of 160 microns with a coating layer) as sensing fibers.

The verification experiment of the present invention adopts fibers having different cladding diameter, i.e., a standard optical fiber and a small-diameter optical fiber, demodulates to achieve a temperature variation $\Delta T$ and a strain variation $\Delta \varepsilon$ according to the system and the method of the present invention when the temperature and the strain change simultaneously. According to the previous measurements, the temperature sensing coefficient of the small-diameter optical fiber is $K_{T1}=3.4747$ GHz/° C., the temperature sensing coefficient of the standard optical fiber is $K_{T2}=2.1385$ GHz/° C. The strain sensing coefficient of the small-diameter optical fiber is $K_{S1}=0.1483$ GHz/$\mu\varepsilon$, and the strain sensing coefficient of the standard optical fiber is $K_{S2}=0.0348$ GHz/$\mu\varepsilon$. The standard optical fiber and the small-diameter optical fiber are attached on a cantilever beam at the same time, and the adhesive on the cantilever beam is heated by a heater band. The actual strain variation on the cantilever beam can be achieved by applying weight thereon, and the actual temperature variation on the heater band can be achieved by a platinum resistance temperature sensor attached thereon. The effectiveness of the method will be verified via comparing the actual strain variation and the actual temperature variation with the temperature variation $\Delta T$ and the strain variation is $\Delta \varepsilon$ demodulated according to the system and the method of the present invention.

TABLE 1

Comparison between measured temperature variation and actual temperature variation

| Actual temperature variation/° C. | Measured temperature variation/° C. | Error (Measured value - Actual value)/° C. |
| --- | --- | --- |
| 0 | 0 | 0 |
| 1 | 0.81 | −0.19 |
| 1.98 | 1.71 | −0.27 |
| 3.02 | 3.15 | 0.13 |
| 4.04 | 4.16 | 0.12 |
| 5.03 | 5.18 | 0.15 |
| 6.05 | 5.87 | −0.18 |
| 7.02 | 6.98 | −0.04 |
| 8.08 | 8.10 | 0.02 |
| 9.06 | 8.89 | −0.17 |
| 11.02 | 10.45 | −0.57 |

TABLE 2

Comparison between measured strain variation and actual strain variation

| Actual strain variation/$\mu\varepsilon$ | Measured strain variation/$\mu\varepsilon$ | Error (Measured value - Actual value)/$\mu\varepsilon$ |
| --- | --- | --- |
| 0 | 0 | 0 |
| 15 | 22.33 | 7.33 |
| 30 | 38.61 | 8.61 |
| 45 | 46.18 | 1.18 |
| 60 | 63.60 | 3.60 |
| 75 | 81.01 | 6.01 |
| 90 | 102.20 | 12.20 |
| 105 | 113.56 | 8.56 |
| 120 | 124.92 | 4.92 |
| 135 | 140.06 | 5.06 |
| 150 | 155.96 | 5.96 |

As can be seen from Table 1 and Table 2, the maximum measurement error of the temperature variation is 0.57° C., and the measurement error of the strain variation is 12.2$\mu\varepsilon$.

It will be understood by those skilled in the art that the drawings are merely illustrative of a preferred embodiment, and that the reference No. of the embodiments of the present invention are for illustrative purposes only and are not indicative of ranking.

The foregoing specific implementations are merely illustrative but not limiting. A person of ordinary skill in the art may make any modifications, equivalent replacements and improvements under the teaching of the present invention without departing from the purpose of the present invention and the protection scope of the appended claims, and all the modifications, equivalent replacements and improvements shall fall into the protection scope of the present invention.

What is claimed is:

1. A device for simultaneously measuring strain and temperature based on optical frequency domain reflection, comprising a tunable laser; a beam splitter, a main interferometer unit, a light source phase monitor based on an auxiliary interferometer, an acquisition device and a computer processing unit, wherein
  (a) said tunable laser provides an emergent light;
  (b) said beam splitter splits said emergent light in a ratio of 1:99 into two light sources for said light source phase monitor and said main interferometer unit, respectively;
  (c) said main interferometer unit comprises two Mach-Zehnder interferometers, each comprising a circulator, a 50:50 beam splitter, a 50:50 coupler, a polarization controller, a sensing fiber, a first polarization beam splitter, a second polarization beam splitter, a first balanced detector and a second balanced detector which outputs analog signals of interference;

(d) said acquisition device converts said analog signals into digital signals of interference; and
(e) said computer processing unit processes said digital signals of interference to obtain simultaneously measured values for strain and temperature; and
(f) said sensing fibers of said two Mach-Zehnder interferometers are positioned parallel.

2. The device according to claim 1, wherein said sensing fibers of said two Mach-Zehnder interferometers differ from each other in their cladding diameters.

3. The device according to claim 1, wherein said sensing fibers of said two Mach-Zehnder interferometers each have a temperature sensing coefficients $K_{T1}$ and $K_{T2}$, respectively, and a strain sensing coefficients $K_{S1}$ and $K_{S2}$, respectively, and $K_{S1}K_{T2}-K_{T1}K_{S2}\neq 0$.

4. The device according to claim 1, wherein said computer processing unit processes said digital signals of interference based on an equation as follows:

$$\begin{bmatrix} \Delta T \\ \Delta\varepsilon \end{bmatrix} = \frac{1}{K_{S1}K_{T2}-K_{T1}K_{S2}} \begin{bmatrix} K_{T2} & -K_{T1} \\ -K_{S2} & K_{S1} \end{bmatrix} \begin{bmatrix} \Delta f_1 \\ \Delta f_2 \end{bmatrix},$$

wherein $\Delta T$ and $\Delta\varepsilon$ are measured temperature variation and strain variation, respectively; $K_{T1}$ and $K_{T2}$ are temperature sensing coefficients of said sensing fibers of said two Mach-Zehnder interferometers; $K_{S1}$ and $K_{S2}$ are strain sensing coefficients of said sensing fibers of said two Mach-Zehnder interferometers, and $\Delta f_1$ and $\Delta f_2$ are Rayleigh scattering spectral frequency shift of said sensing fibers of said two Mach-Zehnder interferometers.

5. A method for simultaneously measuring strain and temperature based on optical frequency domain reflection, comprising steps:
(a) splitting an emergent light of a tunable laser by a ratio of 1:99 into two beams which are sent to a light source phase monitor and a main interferometer unit, respectively;
(b) collecting phase information of said emergent light in real time as provided by said light source phase monitor;
(c) measuring Rayleigh backscattering in two sensing fibers which have respective temperature sensing coefficients $K_{T1}$ and $K_{T2}$ and respective strain sensing coefficients $K_{S1}$ and $K_{S2}$, to obtain Rayleigh scattering spectral frequency shifts $\Delta f1$ and $\Delta f2$, respectively;
(d) obtaining measured temperature variation and strain variation values $\Delta T$ and $\Delta\varepsilon$, respectively, according to the following equation:

$$\begin{bmatrix} \Delta T \\ \Delta\varepsilon \end{bmatrix} = \frac{1}{K_{S1}K_{T2}-K_{T1}K_{S2}} \begin{bmatrix} K_{T2} & -K_{T1} \\ -K_{S2} & K_{S1} \end{bmatrix} \begin{bmatrix} \Delta f_1 \\ \Delta f_2 \end{bmatrix}.$$

6. The method according to claim 5, wherein said two sensing fibers differ from each other in their cladding diameters.

7. The method according to claim 5, wherein said two sensing fibers are selected to satisfy the requirement: $K_{S1}K_{T2}-K_{T1}K_{S2}\neq 0$.

* * * * *